(12) United States Patent  (10) Patent No.: US 6,678,152 B2
Kim  (45) Date of Patent: Jan. 13, 2004

(54) ASSEMBLY IN A DISPLAYING APPARATUS

(75) Inventor: Kwey-Hyun Kim, Suwon (KR)

(73) Assignee: Samsung Elecrtonics Co., Ltd., Kyungki-do (KR)

( * ) Notice: Subject to any disclaimer, the term of this patent is extended or adjusted under 35 U.S.C. 154(b) by 192 days.

(21) Appl. No.: 09/986,418

(22) Filed: Nov. 8, 2001

(65) Prior Publication Data

US 2002/0080566 A1 Jun. 27, 2002

(30) Foreign Application Priority Data

Dec. 27, 2000  (KR) .......................... 2000-83364

(51) Int. Cl.⁷ .............................. G06F 1/16; H05K 7/16
(52) U.S. Cl. ...................... 361/681; 361/683; 349/58; 348/207.99; D14/336; 381/365; 381/388; 292/DIG. 53
(58) Field of Search ................................ 361/681, 682, 361/683; 349/58; 348/207.99–207.11; D14/336, 439, 448–450; 381/365, 355, 388; 292/DIG. 53

(56) References Cited

U.S. PATENT DOCUMENTS

| | | | | |
|---|---|---|---|---|
| 3,630,558 A | * | 12/1971 | Andreini et al. | ..... 292/DIG. 53 |
| 5,801,919 A | * | 9/1998 | Griencewic | .................. 361/683 |
| 6,134,335 A | * | 10/2000 | Yang | ........................... 361/683 |
| 6,188,569 B1 | * | 2/2001 | Minemoto et al. | .......... 361/683 |
| 6,535,380 B1 | * | 3/2003 | Lee et al. | .................... 361/683 |

FOREIGN PATENT DOCUMENTS

| | | |
|---|---|---|
| JP | 61-199794 | 12/1986 |
| JP | 10-056681 | 2/1998 |
| JP | 10-294981 | 11/1998 |
| KR | 1999-021380 | 6/1999 |

* cited by examiner

*Primary Examiner*—Lisa Lea-Edmonds
(74) *Attorney, Agent, or Firm*—Robert E. Bushnell, Esq.

(57) ABSTRACT

A compartment assembly for a displaying apparatus is disclosed. An external signal input unit is installed in a portion of the compartment for receiving a video or audio signal generated from an outside of the displaying apparatus. The compartment assembly includes an opening formed on a front cover of the displaying apparatus, a support formed in an inner circumference of the front cover and disposed adjacent to the opening for supporting the external signal input unit, and a cover detachably coupled to the front cover for closing the opening. The cover includes a rib extended from a bottom of the cover so as to contact the external signal input unit for preventing the external signal input unit from moving when the cover closes the opening.

20 Claims, 7 Drawing Sheets

ASSEMBLY IN A DISPLAYING APPARATUS

CLAIM OF PRIORITY

This application makes reference to, incorporates the same herein, and claims all benefits accruing under 35 U.S.C. §119 from an application for DISPLAY earlier filed in the Korean Industrial Property Office on Dec. 27, 2000 and there duly assigned Ser. No. 83364/2000 by that Office.

BACKGROUND OF THE INVENTION

1. Field of the Invention

The present invention relates in general to a compartment assembly in a displaying apparatus, and more particularly, to a compartment assembly for mounting an external signal receiver within a compartment of the displaying apparatus.

2. Description of the Related Art

Compartments have been formed on a displaying apparatus to accommodate various types of external signal input units, such as a microphone, a camera, etc. The external signal input units are used for receiving video and audio signals generated outside the displaying apparatus, thereby allowing the displaying apparatus to implement multimedia functions using external video and audio input signals. Typically, the compartment is provided in a front cover of the displaying apparatus, and the external signal input units are mounted within the compartment. The compartment formed in the displaying apparatus, however, is disadvantageous due to complicated structure and assembling process.

SUMMARY OF THE INVENTION

It is an object of the present invention to provide an improved compartment assembly for a displaying apparatus.

It is another object to provide a compartment assembly able to reduce the number of components for assembling a microphone unit into the auxiliary compartment.

It is still another object to provide a compartment assembly suitable to replace the microphone mounted within the compartment.

It is yet another object to provide a compartment assembly able to reduce an assembling process of mounting a microphone unit into the compartment.

It is still yet an object to provide a compartment assembly easily assembled into and dissembled from a displaying apparatus.

It is also an object to provide a compartment assembly able to reduce a production cost of a displaying apparatus having a microphone unit.

These and other objects of the invention may be achieved by providing a displaying apparatus with a compartment formed on a front cover of the displaying apparatus. The displaying apparatus includes a display panel, the front cover circumferentially surrounding a front of the panel, and an external signal input unit installed in the compartment for receiving a video or audio signal generated from an outside of the displaying apparatus. The compartment includes an opening formed on a front plate and a top plate of the front cover, a support formed in an inner circumference of the front plate of the front cover disposed adjacent a lower portion of the opening for supporting the external signal input unit; and a cover detachably coupled to the front cover for closing the opening of the compartment.

The cover includes a rib extended downwardly from a bottom of the cover to contact the external signal input unit placed on the support for preventing the external signal input unit from moving from the support. The rib is fitted into the external signal input unit when the cover is attached to the front cover to close the opening of the compartment. A plurality of hooks are downwardly formed on a bottom of the cover and coupled to the support to hold the cover against the compartment when the cover is attached to the front cover.

A guide plate is attached to a bottom of the top plate of the front cover and disposed adjacent to a top portion of the opening of the compartment. The guide plate includes two extensions, a slit formed between the two extensions, a pair of slots formed on both sides of the two extensions and communicating with the slit.

A pair of second hooks downwardly formed on the bottom to the top plate of the front cover is coupled to the guide plate when the cover is attached to the compartment for closing the opening of the compartment. The rib of the cover is disposed between the two extensions and in the slit to be contact with the external signal input unit. The first hooks are inserted into the respective slots to be coupled to the support of the compartment while the second hooks are inserted into one of slots to be coupled to the guide plate. The external signal input unit includes a microphone and a hole communicating with a second hole formed on the front plate of the front cover.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 4:
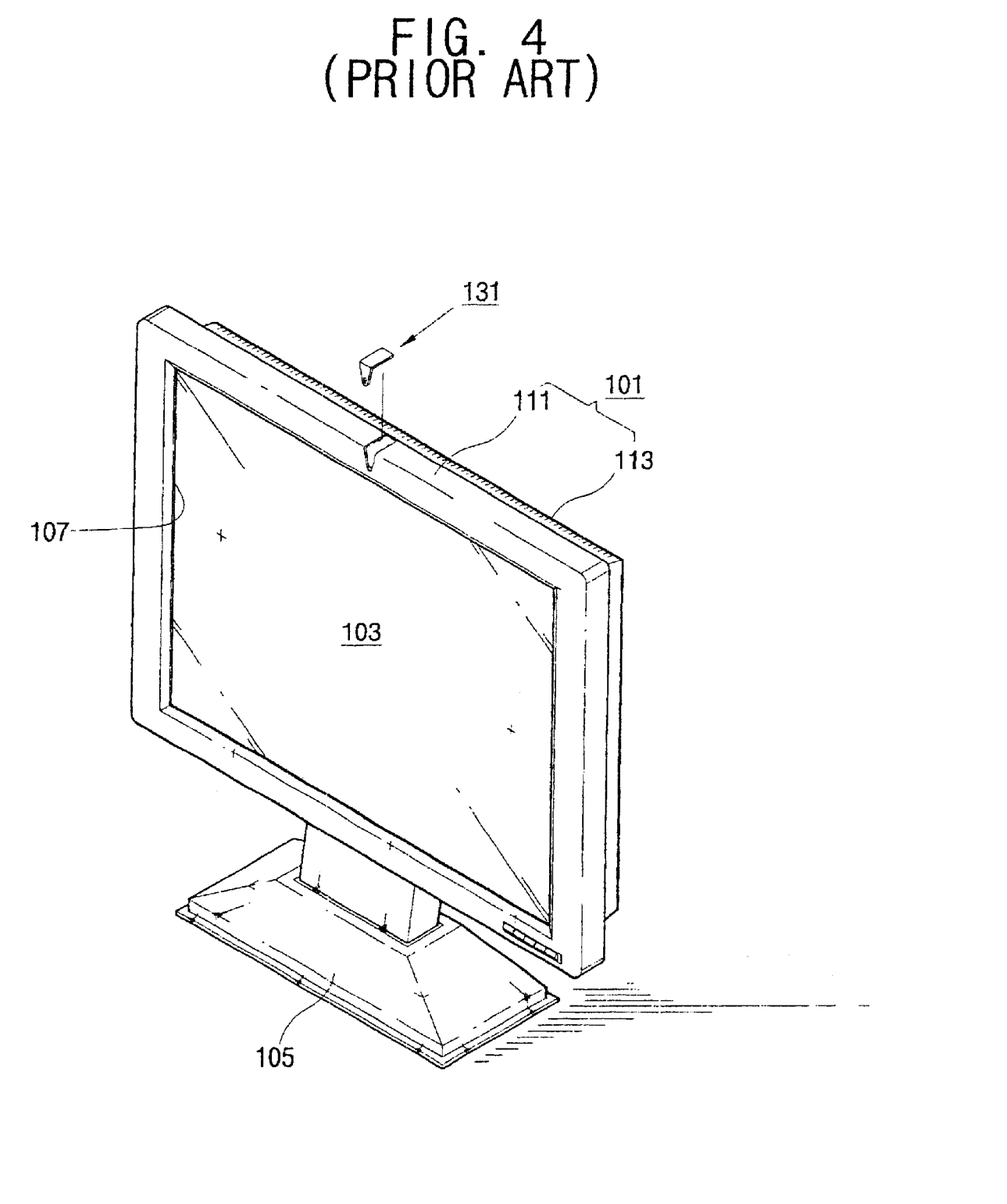
FIG. 4 is a perspective view of a conventional displaying apparatus.
Figure 5:
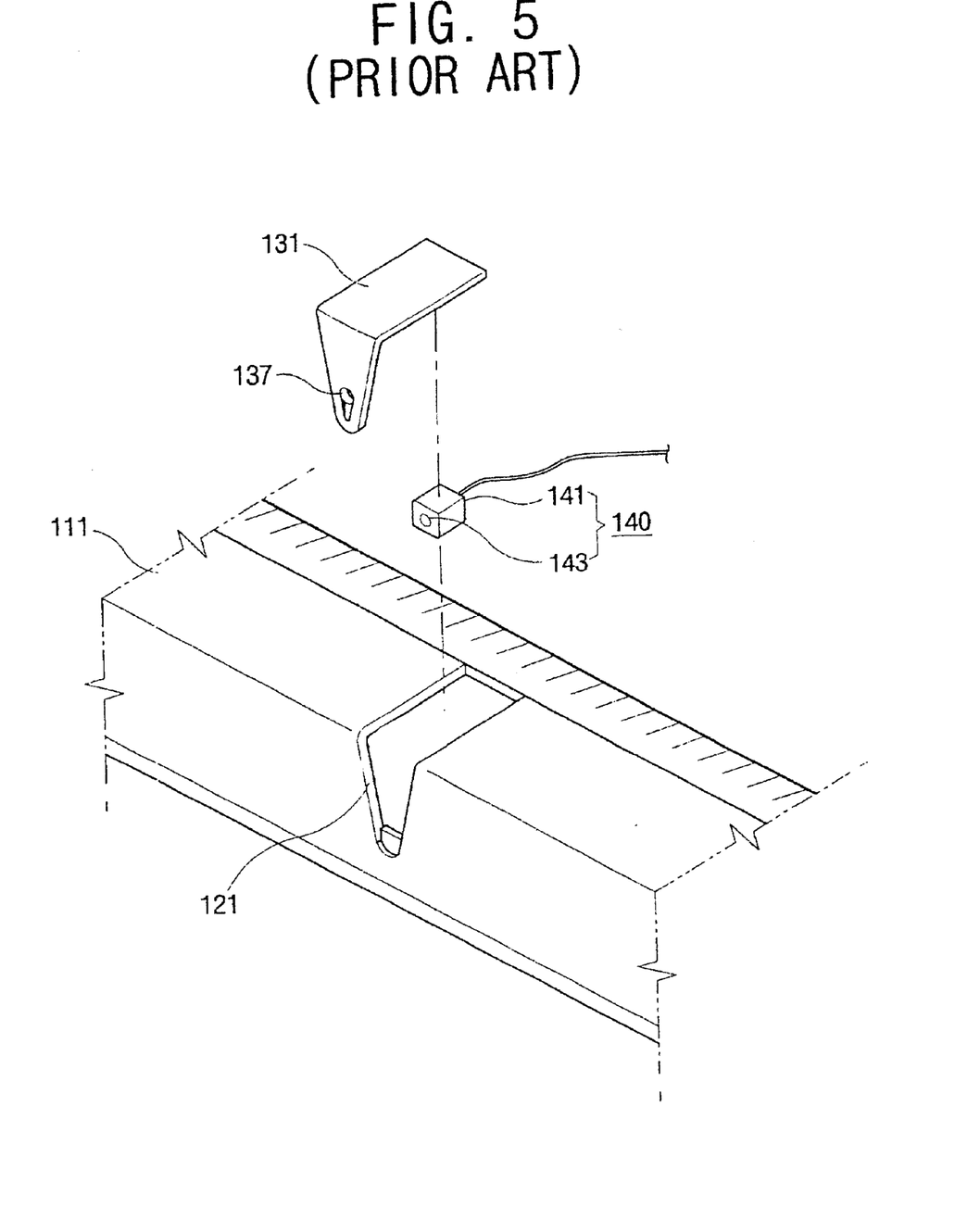
FIG. 5 is a partial perspective view of a compartment and a microphone unit of FIG. 4.

The conventional displaying apparatus equipped with the microphone is shown in FIGS. 4 and 5. The displaying apparatus includes a cover casing 101, an LCD panel 103 disposed within the cover casing 101 for displaying a visual image thereon, and a stand member 105 supporting cover casing 101. Cover casing 101 includes a front cover 111, a rear cover 113 attached to a rear portion of front cover 111, and a LCD panel 103 disposed between front cover 111 and rear cover. The front cover 111 is provided with an opening 107 through which a screen of LCD panel 103 displaying the visual image is viewed from the outside of the displaying apparatus.

Figure 6:
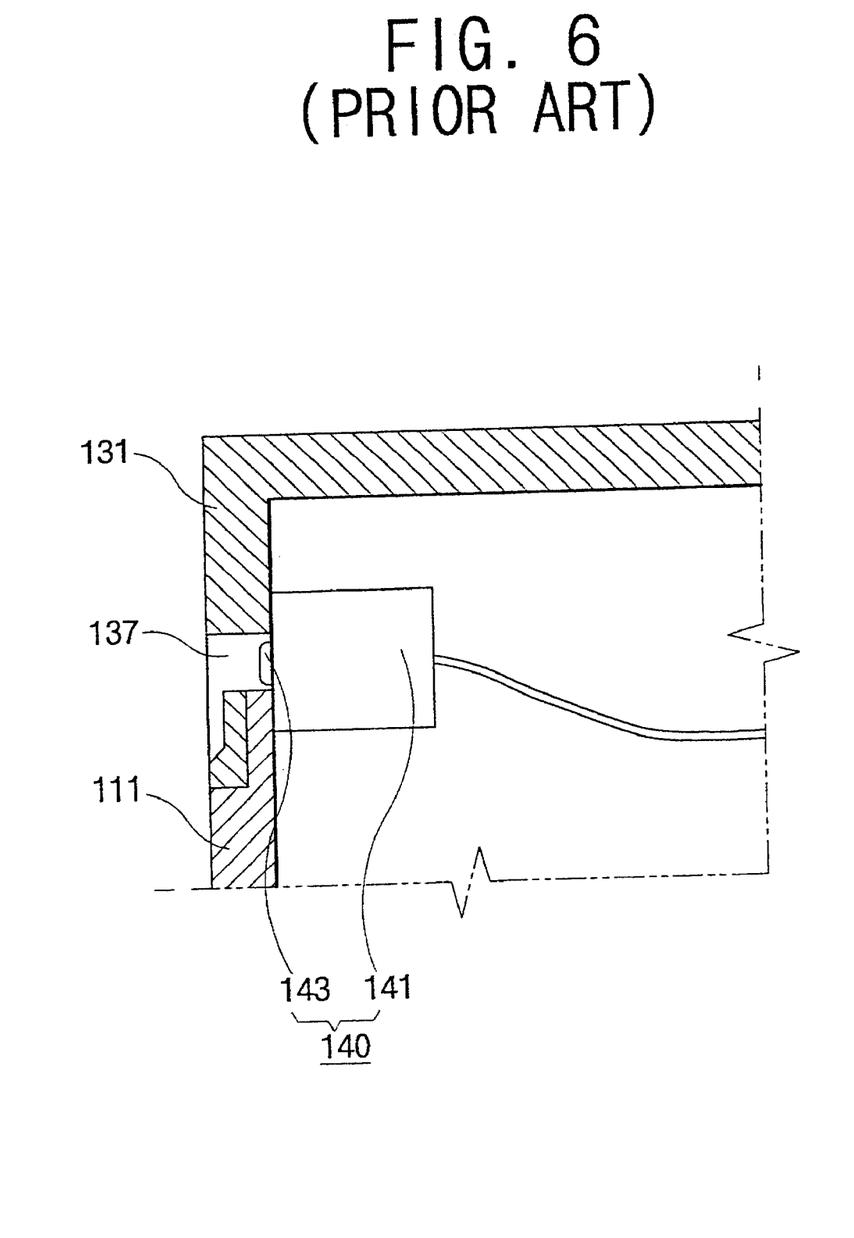
FIG. 6 is a partial cross-sectional view showing the compartment and the microphone unit of FIG. 5.

As illustrated in FIGS. 4 through 6, a compartment 121 and a cover member 131 closing compartment 121 are provided in a top portion of front cover 111. Within compartment 121 is mounted a microphone unit 40 for receiving an audio signal as the external input signal. Cover member 131 has a shape corresponding to an opening portion of compartment 121 and is mounted to the front cover 111 so as to close the opening portion of compartment 121. On cover member 131 is formed a signal passing hole 137 through which the audio signal generated from the outside of the displaying apparatus passes.

The microphone unit 140 includes a microphone casing 141 and a microphone 143 housed within microphone casing 141. A front surface of the microphone casing 141 is bonded along an inner circumference of front cover 111 disposed adjacent to the opening portion of compartment 121. Microphone 143 is disposed adjacent to signal passing hole 137 formed in cover member 131. However, since microphone unit 140 needs to be attached and bonded to front cover 111 by an adhesive material, it is very inconvenient to assemble the conventional displaying apparatus.

Moreover, a significant period of time is required until microphone unit 140 is completely bonded to front cover 111, thereby lengthening the assembling time of the displaying apparatus. Furthermore, when microphone unit 140 is attached to an inner surface of front cover 111 in a wrong or incorrect position, or when microphone unit 140 is defected, microphone unit 140 needs to be replaced with a new one. It is not easy to remove or detach microphone 140 from front cover 111 due to an bonding material applied to the inner surface of front cover 111 and microphone 140.

Figure 7:
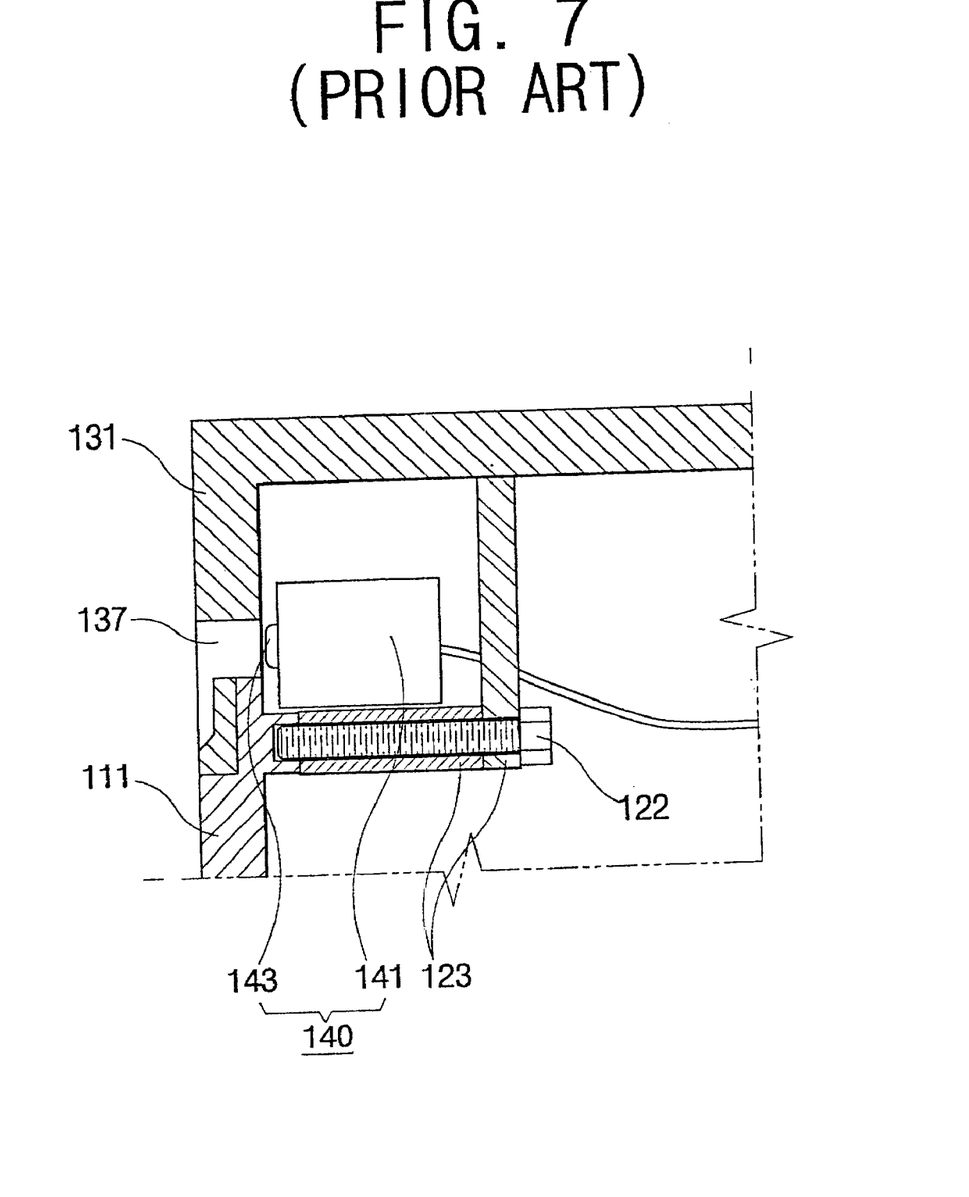
FIG. 7 is a partial cross-sectional view of another compartment and microphone unit of FIG. 5.

FIG. 7 shows another conventional displaying apparatus including a support 123 supporting microphone unit 140. Support 123 is provided in an inner circumference of the opening portion of front cover 111. The support 123 is screw-coupled to front cover 111. Since microphone unit 140 needs to be assembled into the displaying apparatus with a screw, the assembling process of the displaying apparatus, however, is still disadvantageous due to the additional and separate parts for mounting microphone unit 140 into auxiliary compartment 121 of the displaying apparatus.

Figure 1:
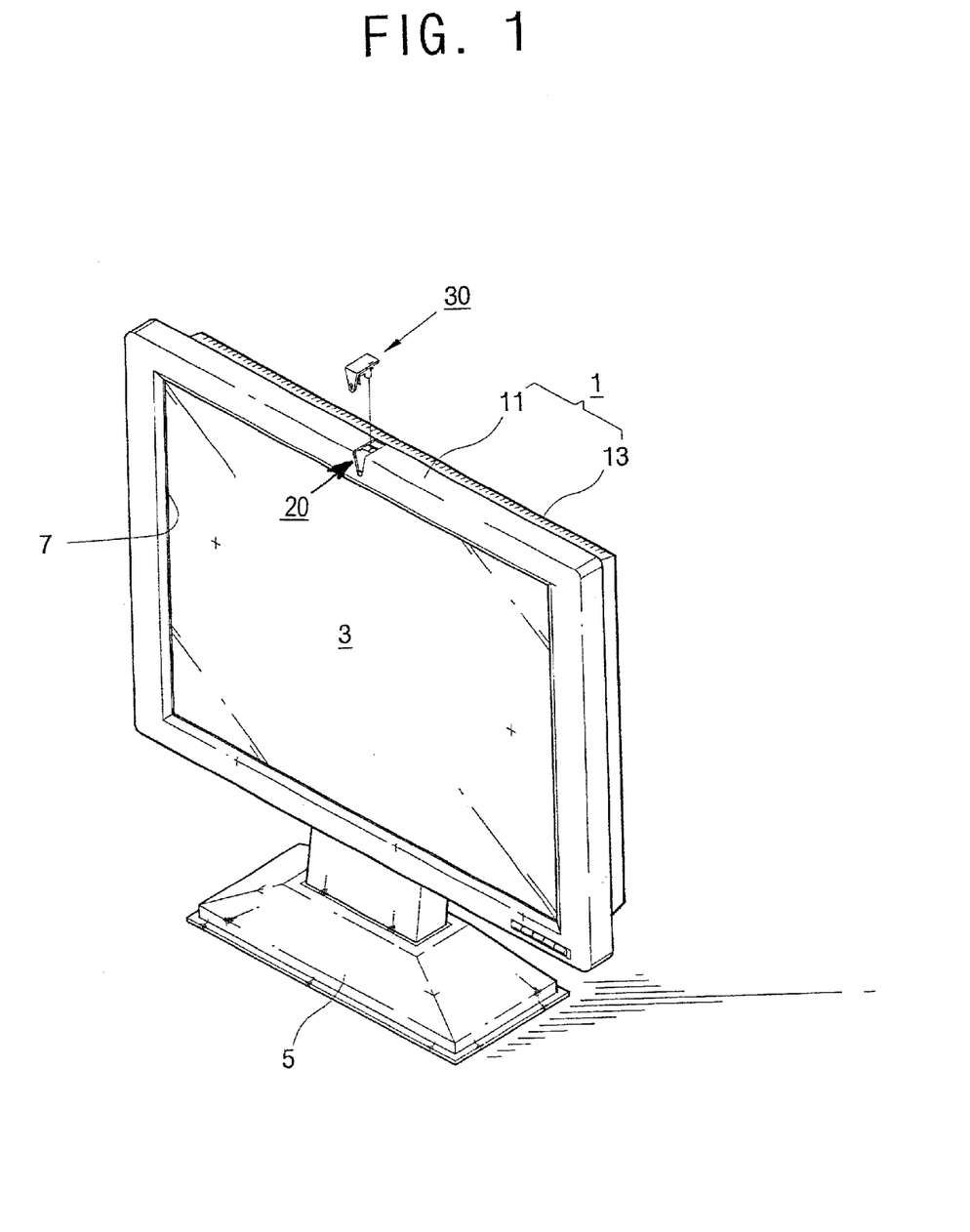
FIG. 1 is a perspective view of a displaying apparatus constructed according to the present invention.

In FIG. 1, a displaying apparatus includes a cover casing 1, an LCD panel 3 disposed within cover casing 1 to display a visual image thereon, and a stand member 5 supporting cover casing 1. Cover casing 1 includes a front cover 11, a rear cover 13 coupled to a rear part of front cover 11, and a space provided between front cover 11 and rear cover 13 for housing LCD panel 3 therein. Front cover 11 is provided with a first opening 7 through which a screen of LCD panel displaying a visual image is exposed to an outside of the displaying apparatus.

Figure 2:
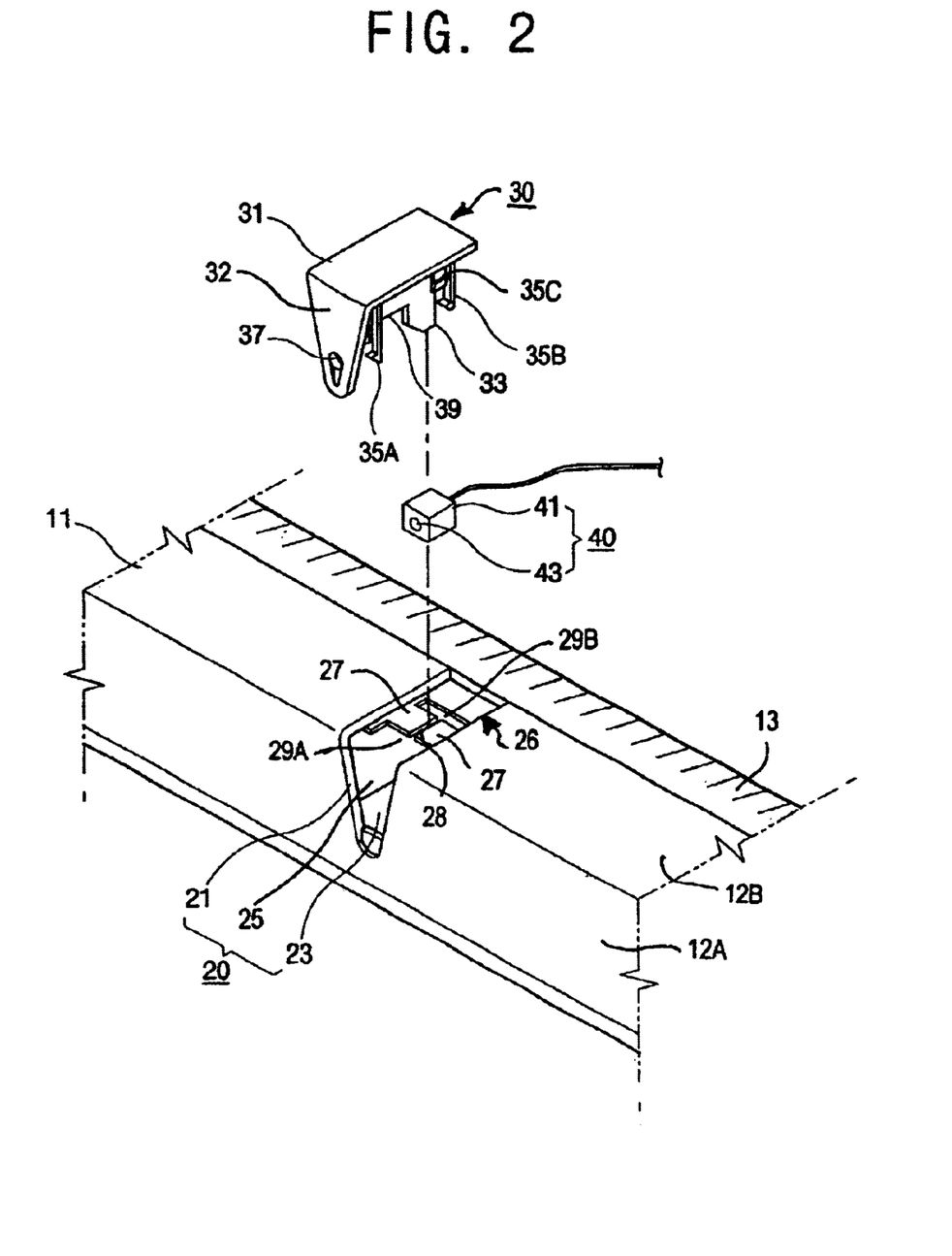
FIG. 2 is a perspective view of a compartment and a microphone unit of FIG. 1.
Figure 3:
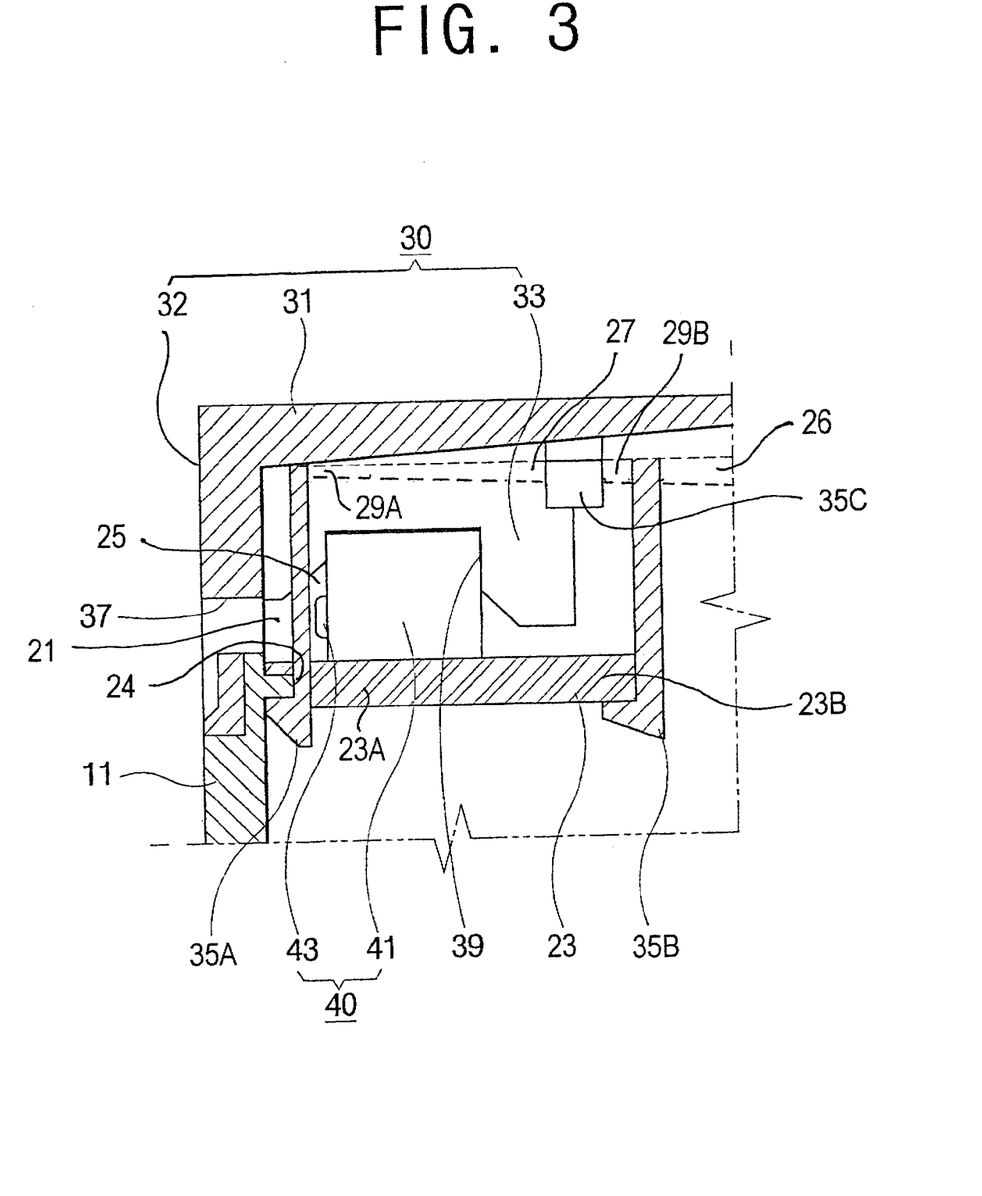
FIG. 3 is a partial cross-sectional view of the compartment assembly of FIG. 2.

As illustrated in FIGS. 2 and 3, on a front plate 12A and a top plate 12B of front cover 11 are provided with a compartment 20 and a cover unit 30 closing compartment 20. Within compartment 20 is installed a microphone unit 40 as an external signal receiving unit receiving an audio signal generated from the outside of the displaying apparatus.

Compartment 20 includes a second opening 21 formed along front plate 12A and top plate 12B of front cover 11, and a support 23 extended from an inner surface of front plate 12A of cover 11 adjacent to a lower portion of second opening 21 for supporting microphone unit 40. Second opening 21 is formed along a front plate 12A and a top plate 12B of front cover 11, and support 23 is horizontally extended from the inner circumferential surface of front cover 11 adjacent to a front and lower portion of second opening 21. Support 23 has a predetermined width and length to support microphone unit 40 while a receptacle 25 is provided between second opening 21 and support 23 to accommodate microphone unit 40. A pair of insertion holes 24 are formed on support 23.

A guide plate 26 is fixed to a bottom of top plate 12B of front cover 11 and exposed to a top portion of second opening 21 of compartment 20. Guide plate 26 includes two extensions 27 formed on guide plate 26 and spaced-apart from support 23 to form receptacle 25. A slit 28 is formed between distal ends of extensions 27, and a pair of slots 29A, 29B are formed on both sides of extensions 27. Slit 28 is disposed between slots 29A, 29B and communicates with slots 29A, 29B.

Cover unit 30 covering second opening 21 of compartment 20 includes a top cover 31 and a front cover 32. Top cover 31 is disposed on the same plane as top plate 12B of front cover 11, and front cover 32 is disposed on the same plane as front plate 12A of front cover 11. A rib 33 for preventing movement of microphone unit 40 disposed within receptacle 25 is downwardly extended from a bottom of top cover 31 of cover unit 30 toward support 23 of compartment 20. Rib 33 has a concave portion 39 facing support 23 and having a shape corresponding to microphone unit 40.

Hooks 35A, 35B, 35C are extended from the bottom of top cover 31 of cover unit 30. Hooks 35A pass through slot 29A and are inserted into insertion holes 24 formed on support 23 to allow cover 30 to be held by support 23 when cover 30 closes second opening 21 of compartment 20. Hooks 35B pass through slot 29B and are coupled the distal end 23B of support 23 while hooks 35A are inserted into insertion holes 24 in the front end 23A of support 23. Hooks 35C pass through slot 29B and are coupled to guide plate 26. Through front cover 32 of top cover 31 is formed a sound through hole 37 through which sound is picked up by microphone 43 of microphone unit 40.

Concave portion 39 of rib 33 is in contact with an outer circumferential surface of microphone unit 40 which is supported by support 23. Microphone unit 40 is prevented from being moved or shifted from a position where microphone unit 40 is placed on support 23. Microphone unit 40 includes a microphone casing 41 and a microphone 43 both supported by support 23 and securely positioned by rib 33 of cover unit 30.

With this configuration, in order to install the microphone unit 40 to the displaying apparatus, microphone unit 40 is placed on support 23 disposed in receptacle 25 of compartment 20. Microphone unit 40 is disposed on support 23 such that microphone 43 corresponds to sound through hole 37 of cover unit 30.

Once microphone 40 is placed on support 23, cover unit 30 is disposed to close second opening 21 of compartment 20 and then pressed downwardly. Rib 33 of cover unit 30 passes through slit 28 formed between extensions 27 while hooks 35A, 35B, 35C pass through respective slots 29A, 29B. Rib 33 of cover unit 30 is tightly held by the distal ends of extensions 27 when a portion of rib 33 of cover unit 30 is positioned in slit 28 formed between extensions 27. Microphone unit 40 is fitted with concave portion 39 of rib 33 of cover unit 30 while hooks 35A, 35B, 35C formed on cover unit 30 is elastically engaged with insertion hole 24, distal end of support 23, guide plate 26, respectively. Thus, installation of microphone unit 40 into compartment 20 is completed in a simple manner without any separate coupling components, such as screw or bolt and nut, etc.

As described above, by providing support 23 supporting microphone unit 40 within receptacle 25 adjacent to opening formed in front cover 11 and by providing cover unit 30 having a rib 33 preventing movement of microphone unit 40 when cover unit 30 covers second opening 21 of compartment 20, the process of assembling microphone unit 40 into compartment 20 of the displaying apparatus can be easily performed within a comparatively short period of time. In addition, since microphone unit 40 can be easily removed from compartment 20 of front cover 11 by removing cover 30 from second opening 21 of front cover 11, the disassembling and replacement of microphone unit 40 becomes simple and easy.

Moreover, since microphone unit 40 is fitted into rib 33, microphone unit 40 is correctly and firmly positioned on support 23 and within receptacle 25. Furthermore, since there is no need to prepare separate parts for assembling microphone unit 40 into compartment 20 of the displaying apparatus, the production cost is reduced, and the assembling process is reduced.

Although the preferred embodiment of the present invention has been described with respect to a displaying apparatus with an LCD panel, the present invention can be employed in a variety of displaying apparatus, such as a CRT monitor, etc. Also, although the external signal input unit has been described with an example of a microphone receiving the audio signal from the outside, a microphone camera can be used as the external signal input unit.

According to the present invention, there is provided a displaying apparatus with which the assembling and disassembling of the external signal input unit can be made in an easy manner, and the production cost is lowered, and the assembling process becomes simplified. Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An assembly in a displaying apparatus having a casing, comprising:
   a compartment formed on said casing, having an opening and a receptacle communicating with said opening, having a support extended from said easing, said support disposed within said receptacle and adjacent to a first portion of said opening;
   a guide plate attached to said casing, disposed adjacent to a second portion of said opening, having a slot and a slit formed on said guide plate; and
   a cover unit removably attached to said compartment to close said opening, having a hook and a rib, said hook being inserted through said slot of said guide plate and coupled to an insertion hole in said support, said rib being inserted through said slit, said rib having a concave portion being in contact with an outer surface of a pick-up unit disposed in said receptacle between said guide plate and said support when said cover unit closes said opening of said compartment.

2. The assembly of claim 1, said concave portion of said rib having a shape corresponding to and fitted onto said outer surface of said pick-up unit.

3. The assembly of claim 1, said pick-up unit being held in a stationary position by said rib of said cover unit.

4. The assembly of claim 1, said pick-up unit being either one of a microphone and a camera.

5. The assembly of claim 1, said cover unit comprising a through hole disposed adjacent to said pick-up unit to allow sound or an image, external to said casing, to be picked up by said pick-up unit.

6. The assembly of claim 1, said casing having a front plate and a top plate having an angle with said front plate, said opening being formed through a front surface and an adjacent top surface of said front plate and said top plate, respectively, of said casing.

7. The assembly of claim 6, said first portion of said opening being disposed through said front plate of said casing while said second portion of said opening is disposed through said top plate of said casing.

8. The assembly of claim 6, said guide plate being attached to a bottom portion said top plate of said casing.

9. The assembly of claim 1, said guide plate being spaced-apart from said support to accommodate said pick-up unit placed on said support and said rib contacting said pick-up unit.

10. The assembly of claim 1, said concave portion of said rib being a rectangular groove corresponding to an rectangular surface of said pick-up unit.

11. The assembly of claim 1, said cover unit having more than one said hook, a plurality of said hooks being coupled to said support with at least one of said hooks being coupled to said guide plate.

12. The assembly of claim 1, said guide plate having more than one said slot, said slots being in parallel to each other and perpendicular to said slit, said slit being disposed between and communicating with said slots.

13. The assembly of claim 12, said cover unit having more than one said hook, a first pair of said hooks passing through one of said slots of said guide plate and a corresponding pair of insertion holes in a first end of said support adjacent said opening in said casing, a second pair of said hooks passing through the other one of said slots of said guide plate and a corresponding pair of insertion holes in a distal end of said support, and a third pair of said hooks being coupled to said guide plate through said other one of slots of said guide plate, respective ones the hooks of each of said pairs of hooks being disposed on opposite sides of said rib.

14. An assembly in a displaying apparatus having a casing comprising a top plate and a front plate with an opening formed through a front surface and an adjacent a top surface of said front plate and said top plate, respectively, of said casing, said assembly comprising:
   a guide plate attached in said opening to a bottom part of said top plate, said guide plate including a pair of extensions defined by a pair of slots and a slit disposed between said slots;
   a support attached to a back part of said front plate adjacent to said opening;
   a receptacle disposed between and defined by said guide plate and said support, said receptacle having an area for accommodating a pick-up unit disposed on said support; and
   a cover for said opening, said cover having a shape corresponding to a shape of said opening for filing said opening, said cover comprising:
      a rib extending from a bottom surface of top part of said cover, said rib having a concave area for accommodating said pick-up unit to hold said pick-up unit in a stationary position on said support, said slit accommodating passage of said rib when said cover is placed in said opening; and
      a plurality of hooks for securing said cover to said support, such that when said cover closes said opening, each of said pair slots accommodating passage of corresponding ones of said plurality of hooks when said cover is placed in said opening.

15. The assembly as set forth in claim 14, said plurality of hooks comprising:

a first pair of said hooks passing through one of said slots of said guide plate and a corresponding pair of insertion holes in a first end said support adjacent said opening in said casing, respective ones of the hooks of said first pair of hooks being disposed on opposite sides of said rib; and a second pair of said hooks passing through the other one of said slots of said guide plate and a corresponding pair of insertion holes in a distal end said support, respective ones of the hooks of said second pair of hooks being disposed on opposite sides of said rib.

16. The assembly as set forth in claim 14, further comprising a second plurality of hooks being coupled to said guide plate through one of said slots of said guide plate.

17. The assembly as set forth in claim 15, further comprising a third pair of hooks, said third pair of hooks being coupled to said guide plate through said other one of said slots of said guide plate, respective ones of the hooks of said third pair of hooks being disposed on opposite sides of said rib.

18. The assembly as set forth in claim 14, said pick-up unit comprising a microphone, said cover including a through hole to enable said microphone to pick up sound outside said casing.

19. The assembly as set forth in claim 14, said pick-up unit comprising a camera, said cover including a through hole to enable said camera to pick up an image outside said casing.

20. The assembly as set forth in claim 14, said concave portion of said rib being a rectangular groove corresponding to an rectangular surface area of said pick-up unit.

* * * * *